(12) United States Patent
Rizzi et al.

(10) Patent No.: US 6,584,177 B2
(45) Date of Patent: Jun. 24, 2003

(54) MONITORING DEVICE AND METHOD FOR MONITORING A TELECOMMUNICATION NETWORK

(75) Inventors: Edoardo Rizzi, Cavizzana (IT); Michele Innocenti, Abano Terme (IT); Stefano Galetto, Lendinara (IT)

(73) Assignee: Tektronix International Sales GmbH (CH)

( * ) Notice: Subject to any disclaimer, the term of this patent is extended or adjusted under 35 U.S.C. 154(b) by 41 days.

(21) Appl. No.: 09/846,870

(22) Filed: May 1, 2001

(65) Prior Publication Data

US 2001/0055369 A1 Dec. 27, 2001

(30) Foreign Application Priority Data

Jun. 23, 2000 (EP) .............................................. 00113402

(51) Int. Cl.[7] ................................................. H04M 1/24
(52) U.S. Cl. ................. 379/32.01; 379/32.02; 379/1.03
(58) Field of Search ........................... 379/32.01, 29.09, 379/29.1, 32.03, 1.01, 3, 9.06, 22.02, 22.03, 23, 24, 28, 31

(56) References Cited

U.S. PATENT DOCUMENTS

| | | | |
|---|---|---|---|
| 5,448,624 A | | 9/1995 | Hardy et al. |
| 5,488,715 A | * | 1/1996 | Wainwright .............. 379/32.01 |
| 5,787,164 A | | 7/1998 | Haines et al. |
| 5,867,564 A | | 2/1999 | Bhusri |
| 5,905,715 A | | 5/1999 | Azarmi et al. |
| 5,987,112 A | * | 11/1999 | Chakravarti et al. ........ 379/209 |
| 6,400,802 B1 | * | 6/2002 | Legare ..................... 379/1.01 |

* cited by examiner

Primary Examiner—Rexford Barnie
(74) Attorney, Agent, or Firm—Francis I. Gray

(57) ABSTRACT

A monitoring device monitors signaling information on data links of a telecommunication network. The monitoring device also monitors user traffic on voice links of the telecommunication network. From the signaling information and user traffic a measure of user perception quality is derived.

3 Claims, 3 Drawing Sheets

MONITORING DEVICE AND METHOD FOR MONITORING A TELECOMMUNICATION NETWORK

BACKGROUND OF THE INVENTION

The present invention relates to the monitoring of a telecommunication network, and more particularly to a monitoring device and method for determining post dial delay actually perceived by a user.

The quality of service (QoS) provided by a telephone network depends upon a number of factors, among which major roles are played by availability, reliability and call clarity. The availability is related to the actual possibility of gaining access to a service once a request has been forwarded, and to the time it takes to complete such an operation. The reliability from a general point of view refers to the customer expectation of maintaining access to the service as long as needed without interruptions. The call clarity is mainly associated with the intelligibility of the information delivered by the network, i.e., the speech quality for telephone networks.

Assessing QoS is a fundamental task for network operators to promptly highlight malfunctions and to detect possible anomalies in order to avoid customer dissatisfaction, and to verify Service Level Agreement (SLA) conformance. In the evolving telecommunication scenario more and more often traditional local networks are remotely interconnected by means of long distance third party carriers. These carriers may offer cost effective solutions at a reasonably high QoS by exploiting emerging communication technologies. Moreover modern international networks have evolved from point-to-point networks interconnecting different countries to more complex networks with multiple routes between countries. As a consequence the choice of the best route is made on a comparative basis as a trade-off between QoS and costs.

Network operators show therefore an increasing interest in dedicated instrumentation able to appropriately monitor network performance. In-Service Nonintrusive Measurement Devices (INMDs) are suitable for assessing QoS basically by monitoring the signaling associated with calls in progress. Amongst the parameters that an INMD may evaluate by monitoring the signaling, such as the Answer Seizure Ratio (ASR), the Rejected Calls Ratio (RCR) and the Incomplete Calls Ratio (ICR), the Post Dial Delay (PDD) covers a very important role where there is need for comparing different routes to the same destination or to assess the performance of the current route being used.

PDD is defined as the time interval between the end of user or terminal equipment dialing and the reception of an appropriate network message. Such a delay, associated with connection establishment, impacts primarily on customer satisfaction since it is directly perceived by the user. Also it impacts on the costs incurred by the local operators when routing their traffic through long distance carriers since the calls are invoiced as soon as connection establishment is required.

Traditional measurement systems provide estimates of PDD by observing the signaling messages within the data channel of the network, and a typical approach is illustrated in FIG. 1. A first estimate may be easily obtained by calculating the time interval between the seizure and the first network response in the backward direction, as shown in FIG. 2. In some circumstances such an estimate may be acceptable since it fixes a lower boundary, but only partial information is gained about the actual network behavior. Another estimate of PDD may be obtained by calculating the time interval between the seizure and the receipt of answer supervision. However as seen from FIG. 2 such an interval, even if it provides an upper boundary for PDD, is strictly dependent on the customer behavior and therefore is not suitable as an absolute measure.

What is desired is a more effective measurement of PDD that is suitable as an absolute measure of telecommunication network performance.

BRIEF SUMMARY OF THE INVENTION

Accordingly the present invention provides a monitor device and method for determining an absolute measure of telecommunication network performance. Signaling information on a data channel of the telecommunication network is monitored to detect the end of dialing, resetting a post dial delay (PDD) counter at that point. Then an associated voice channel of the telecommunication network is monitored until a useful signal is detected, such as a ringing tone. At that time the PDD counter is stopped and the contents reflect the absolute PDD for the call. Statistical analysis of PDD over multiple samples provides a measure of telecommunication network performance for Service Level Agreement (SLA) conformance.

The objects, advantages and other novel features of the present invention are apparent from the following detailed description when read in conjunction with the appended claims and attached drawing.

DETAILED DESCRIPTION OF THE INVENTION

Figure 2:
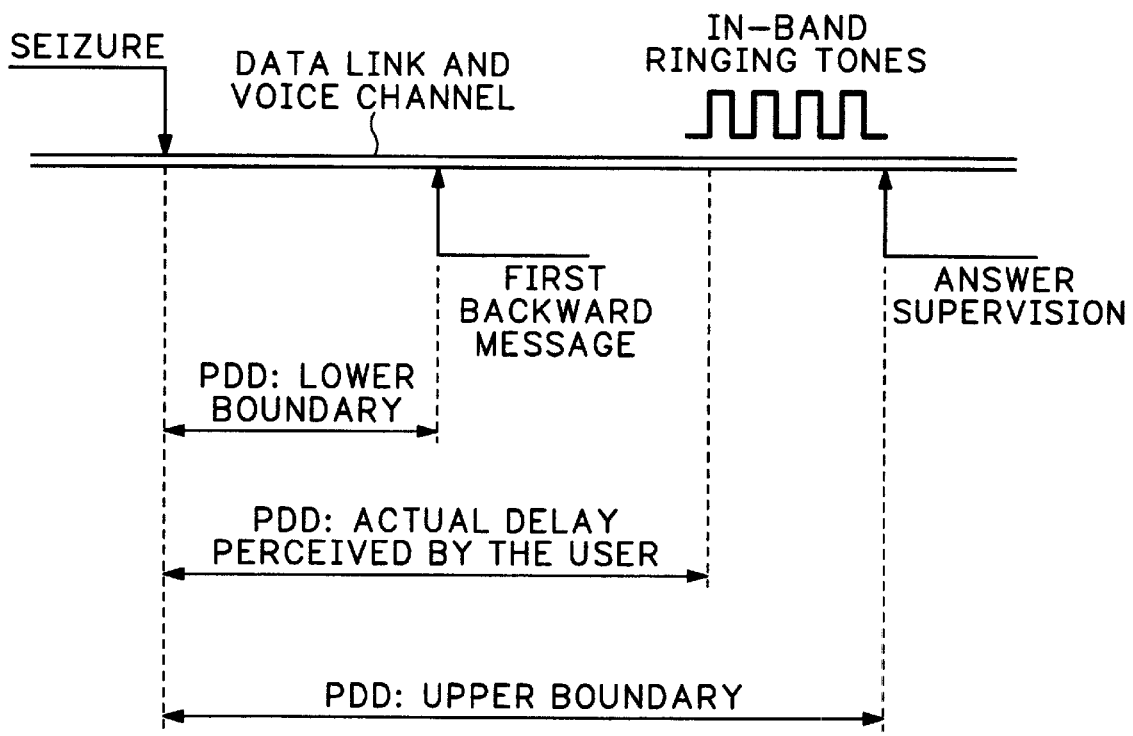
FIG. 2 is a time line diagram view of methods for determining PDD for a telecommunication network.

Described below is a more effective measurement of PDD that has been developed and implemented in an INMD. The detection of the forward signaling messages is combined with the analysis of the in-band signal conveyed by the corresponding voice channel in the backward direction. From such an implementation the time interval between seizure and the first network response actually perceived by the user is assessed, as shown in FIG. 2. Also the measurement is not influenced by customer behavior, i.e., how long it takes the customer to respond at the other end from the user. Further the measurement is performed even if the call is not answered by the customer. Finally the performance of complex networks is managed either on a comparative or on an absolute basis.

Figure 1:
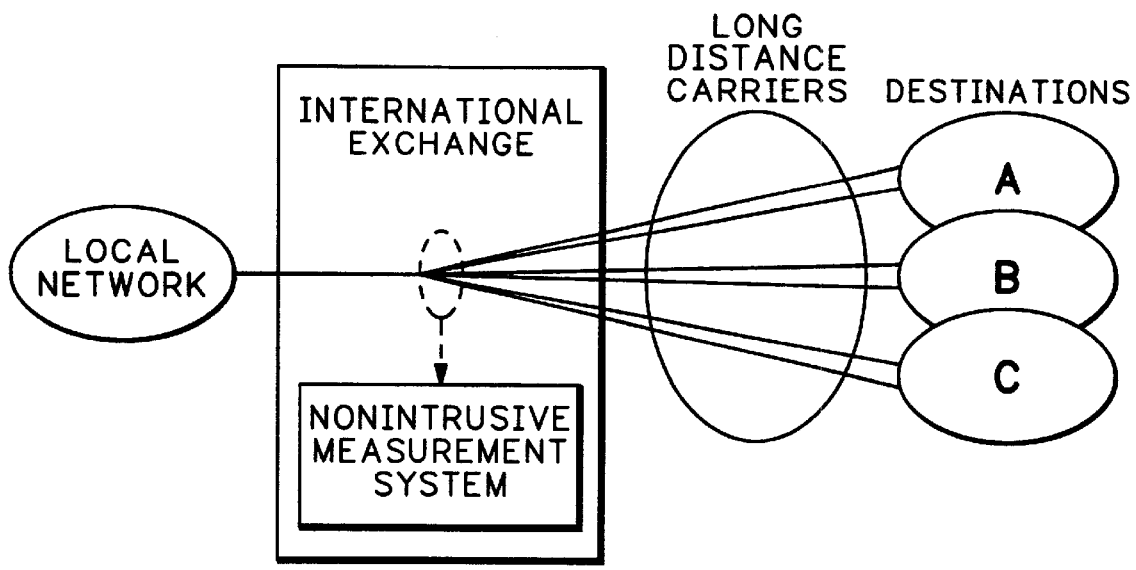
FIG. 1 is a general block diagram view of a telecommunication network using an in-service nonintrusive measurement system.
Figure 3:
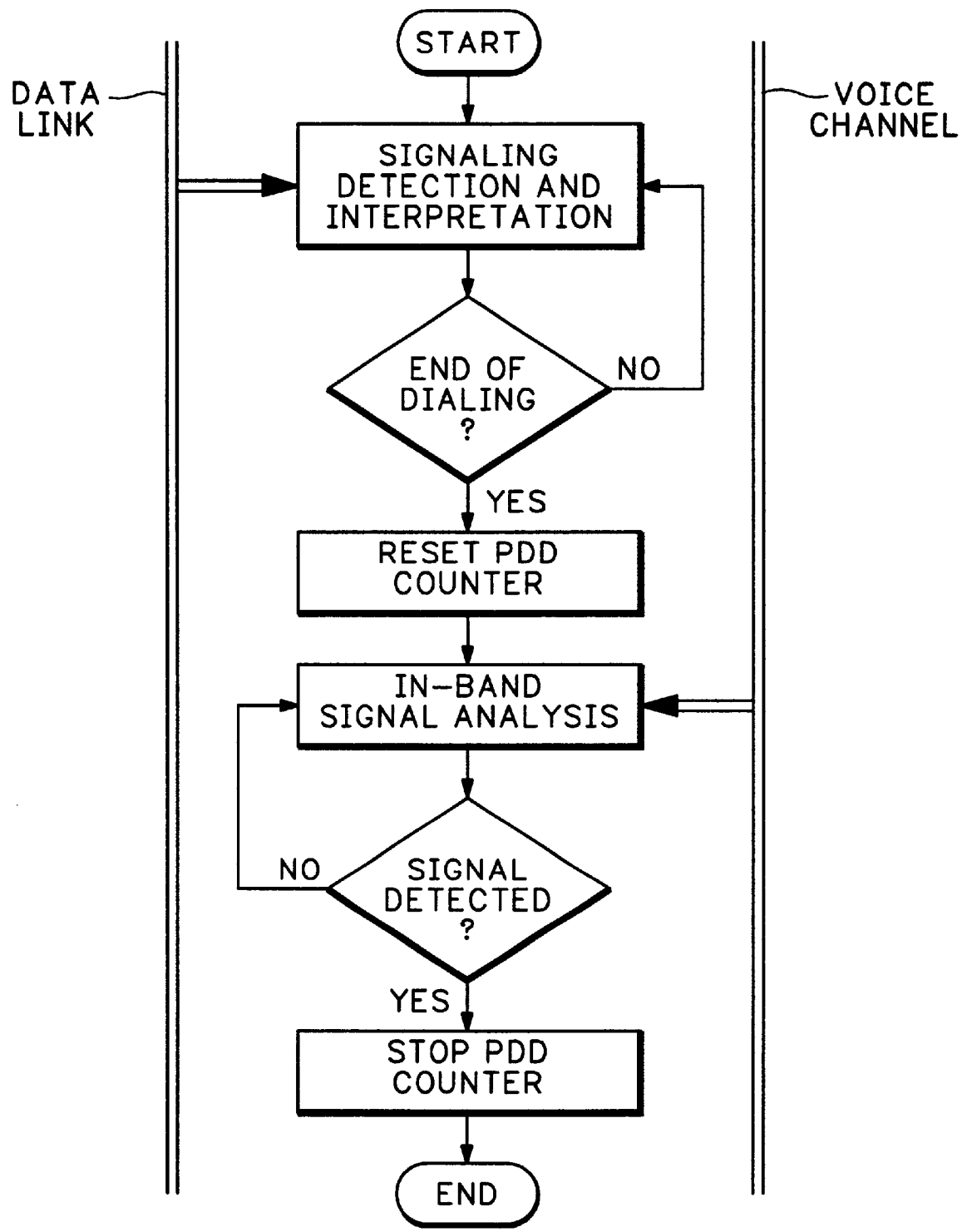
FIG. 3 is a flow diagram view of a method of determining PDD according to the present invention.

The INMD is adjoined to the telecommunication network under test as shown in FIG. 1 such that the data links and the corresponding voice channels are available. Referring now to FIG. 3 as soon as a new call establishment is detected, the system starts and gets ready to analyze and interpret the associated signaling. In particular the system recognizes the instant when the end of dialing occurs by looking for the appropriate message (SEIZURE). When this occurs a PDD counter is reset and in-band signal analysis is activated. The in-band signal analysis uses a signal processing technique that is applied to the signal actually perceived by the user and conveyed by the voice channel. Once a signal is detected in the voice channel, the PDD counter is stopped and the measurement is complete. The contents of the PDD counter contain an absolute measure of PDD for the call independent of customer behavior.

Figure 4:
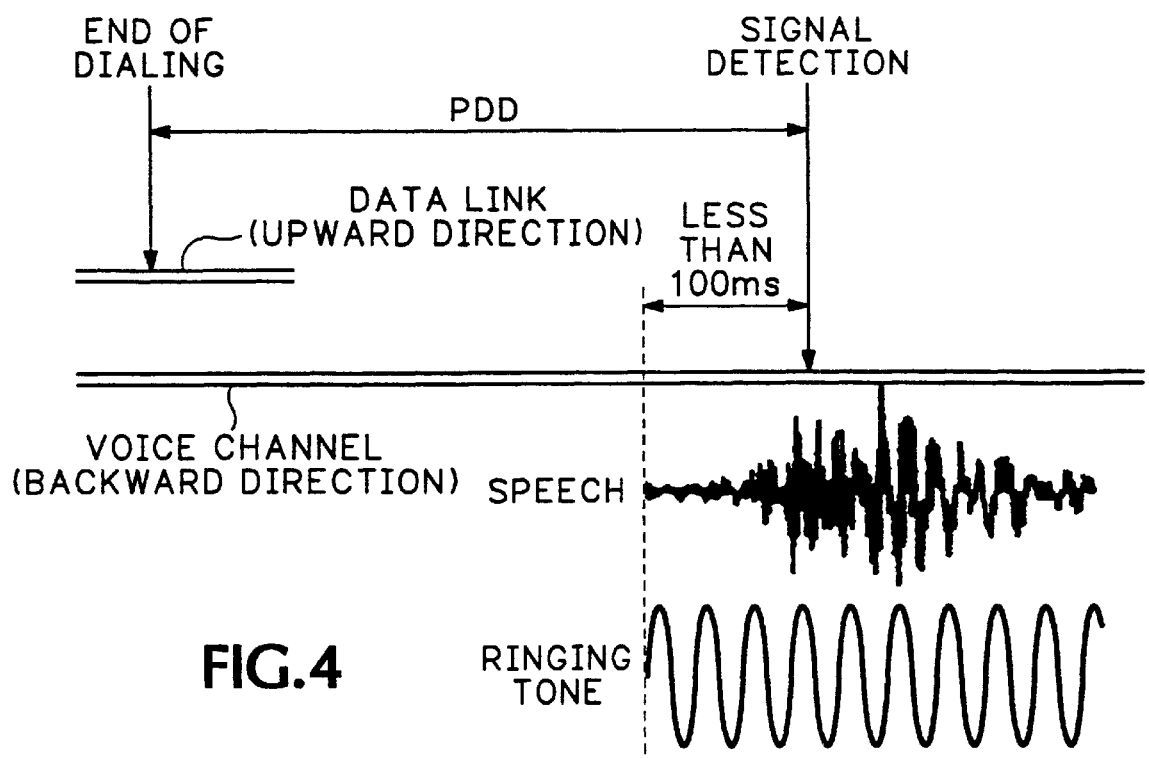
FIG. 4 is a time line diagram view of the method of FIG. 3 according to the present invention.

The implemented signal processing technique is insensible to any sort of noise that may be present in the network, whether it be wide-band or impulsive. Less than 100 ms are needed to detect the presence of a useful signal, as shown in FIG. 4. The useful signal may be a tone, such as a busy tone or ringing tone, or a speech signal such as is associated with a recorded message. As soon as the useful signal is detected, the analysis is suspended and the PDD determined.

PDD is one of a certain number of parameters which defines the performance of a network. In order to verify SLA conformance, the performance of the network needs to be periodically assessed using suitable instrumentation and proper analysis techniques. To perform this statistical analysis, thresholding is applied to a sample of PDD measurements by calculating the percentage of measurements above or below the threshold, such as 15 seconds. To generate an alarm such a percentage is compared with a tolerable maximum percentage, such as 20%. The minimum sample size to be statistically significant may be easily calculated using the graph shown in FIG. 5 for confidence intervals of 95% and 98%.

As an example, having defined:

$PDD_{th}$=threshold for PDD measurements=15 seconds

P=percentage of PDD measurements exceeding $PDD_{th}$ $P_{th}$=threshold for P=20%

Figure 5:
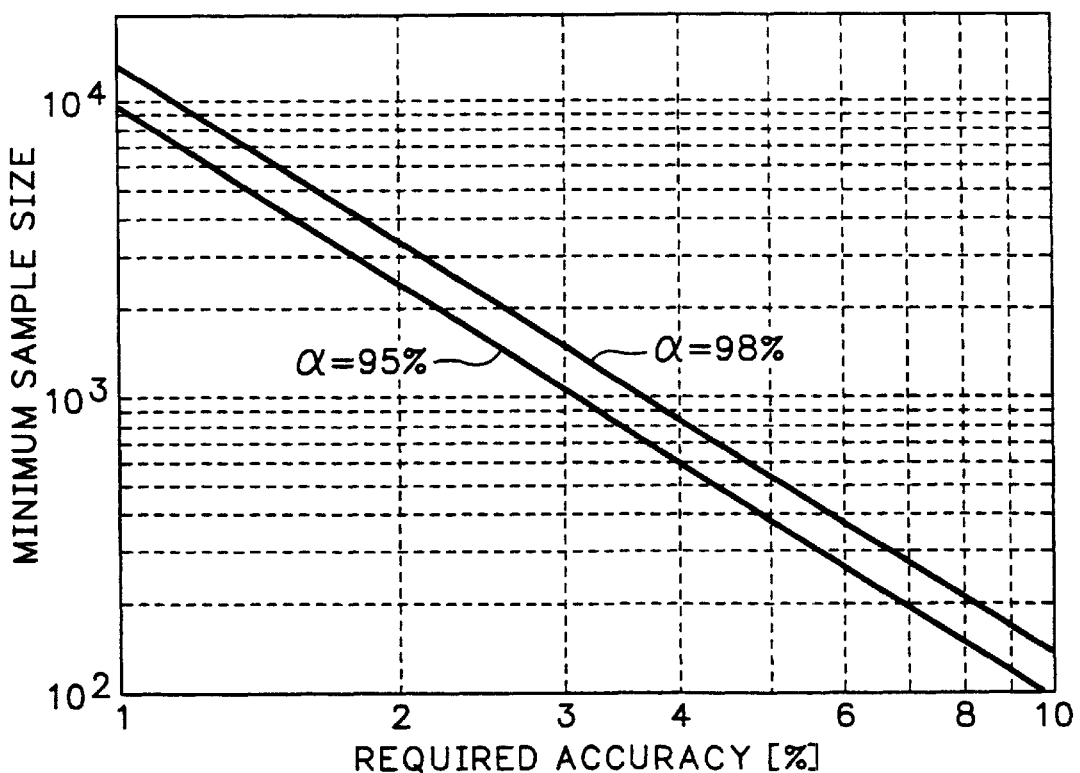
FIG. 5 is a graphic diagram view for determining the number of samples required for statistical analysis of telecommunication network performance measurements.

A=required accuracy=5%

α=confidence interval=95% from FIG. 5

$N_{min}$=minimum sample size=380

Then for a sample of $N_{min}$ PDD measurements an alarm is generated if:

$$P > (P_{th} + A)$$

Thus the present invention provides a monitoring device and method for determining telecommunication network performance using post dial delay as a user perceived measure by resetting a PDD counter when dialing is completed as determined by appropriate signaling messages from the data channel, and stopping the PDD counter when a useful signal is detected in the voice channel.

What is claimed is:

1. A monitoring device comprising:

means for monitoring signaling information on data links of a telecommunication network;

means for monitoring user traffic on voice links of the telecommunication network; and means for deriving a measure for user perception quality of the telecommunication network from the signaling information and the user traffic.

2. The monitoring device as recited in claim 1 wherein the user perception quality is defined by a time between circuit seizure as determined from the signaling information, especially when a last key has been pressed, and when the telecommunication network responds with a useful signal from the user traffic.

3. A method of monitoring a telecommunication network comprising the steps of:

monitoring signaling information on data links of a telecommunication network;

monitoring user traffic on voice links of the telecommunication network; and deriving a measure for user perception quality of the telecommunication network from the signaling information and the user traffic.

* * * * *